United States Patent [19]

Abiru et al.

[11] 4,187,614
[45] Feb. 12, 1980

[54] TRACER HEAD

[75] Inventors: Hisanori Abiru; Yoshiaki Nakao; Yoshiaki Imamura; Hidetaka Sada, all of Hiroshima, Japan

[73] Assignee: Mitsubishi Jukogyo Kabushiki Kaisha, Tokyo, Japan

[21] Appl. No.: 931,280

[22] Filed: Aug. 4, 1978

[51] Int. Cl.² .......................... G01B 7/02; G01B 7/28
[52] U.S. Cl. .................................. 33/174 L; 33/23 K; 33/174 P
[58] Field of Search ............ 33/23 K, 143 L, 147 N, 33/172 E, 174 L, 174 P, 174 PC

[56] References Cited

U.S. PATENT DOCUMENTS

| | | | |
|---|---|---|---|
| 2,437,639 | 3/1948 | Floyd | 33/172 E |
| 2,867,043 | 1/1959 | Jarret et al. | 33/172 E |
| 3,184,855 | 5/1965 | Sebastiani | 33/143 L |
| 3,750,295 | 8/1973 | Nordmann et al. | 33/174 L |
| 3,869,799 | 3/1975 | Neuer et al. | 33/174 L |

FOREIGN PATENT DOCUMENTS

| | | | |
|---|---|---|---|
| 1548266 | 1/1970 | Fed. Rep. of Germany | 33/172 E |
| 296034 | 1/1954 | Switzerland | 33/172 E |

Primary Examiner—Richard R. Stearns
Attorney, Agent, or Firm—Wenderoth, Lind & Ponack

[57] ABSTRACT

A tracer head for effecting three dimensional tracing of a model surface in a highly efficient and precise manner is described herein. The tracer head has a base frame, a tracer shaft, a stylus mounted at one end of the tracer shaft for tracing said model surface, a plurality of supports for the tracer shaft provided at at least two locations on the base frame, each support including a member which has a moderate resiliency in the thrust direction of the tracer shaft as well as either a strong resiliency exceeding a certain extent or rigidity in the radial direction of the tracer shaft, displacement detectors mounted on the base frame, a rod spring forming a part of the tracer shaft disposed between the supports for transmitting movement of said stylus to a thrust direction displacement detector and having a moderate resiliency in the radial direction of said tracer shaft for being bent when the stylus is moved laterally, and a cylindrical transmission member for transmitting a movement of said stylus to the radial direction displacement detectors.

7 Claims, 24 Drawing Figures

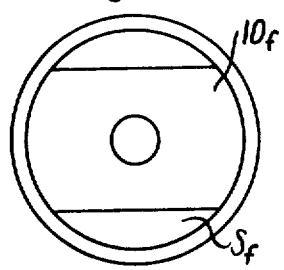
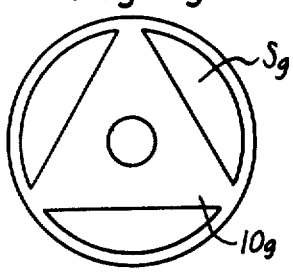
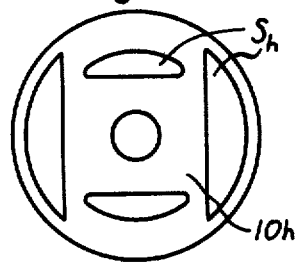
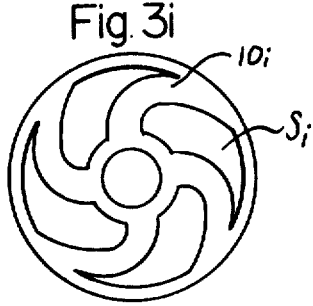
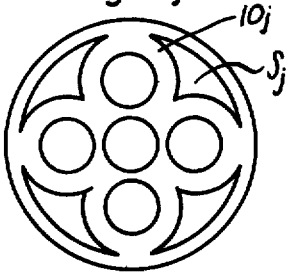
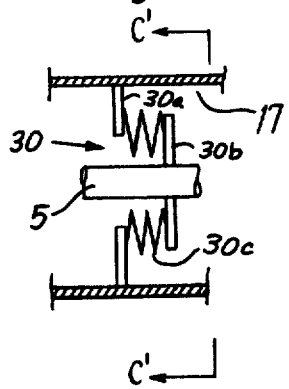
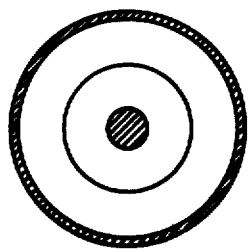

TRACER HEAD

The present invention relates to a tracer head of a profile machining apparatus which can effect tracing of a model in a highly efficient and precise manner.

The conventional tracer heads in the prior art are constructed generally as shown in FIG. 1. More particularly, in FIG. 1 reference numeral 1 designates a stylus mounted at an extreme end of a tracer shaft 5, numeral 2 designates a spherical member mounted at an appropriate position in the middle of the tracer shaft 5, numeral 3 designates a bearing for rotatably supporting said spherical member 2, and said bearing 3 is slidably mounted in a fixed base frame 4 to form a movable joint at the spherical member 2. Numerals 6 and 7 designate displacement detectors disposed in contact with the tracer shaft 5 as shown in the figure, so that a movement of the stylus which is displaced while tracing the profile of a model is transmitted to these displacement detectors 6 and 7 via the tracer shaft 5 supported pivotably and slidably by the spherical member 2 and the bearing 3.

In such a tracer head according to the prior art, since a resistance force due to sliding friction is exerted between the spherical member 2 and the bearing 3 and between the bearing 3 and the fixed base frame 4, the precision and sensitivity of the displacement detectors 6 and 7 in sensing the movement of the stylus 1 is low, and the relation between the outputs of the displacement detector 6 and 7 and the movement of the stylus 1 is non-linear. Furthermore, the prior art device has an additional disadvantage that since the weight and rotational inertia of the movable section consisting of the spherical member 2 and the bearing 3 are large and thus the natural frequency of the vibration system is low, the performance of the device during tracing is lowered. Accordingly, one may be struck with the idea that in order to improve the tracing performance, the natural frequency of the vibration system should be raised while maintaining the weight and rotational inertia of the movable section at large values. However, if this is done, the contact pressure during tracing of the profile of a model 8 with the stylus 1 will become large, and there will occur a new problem that the life of the model 8 is shortened, resulting in poor economy.

Therefore, it is one object of the present invention to provide a novel tracer head which is free from the disadvantages of the tracer heads in the prior art.

Another object of the present invention is to provide a novel tracer head which can effect tracing of a model in a highly efficient and precise manner.

Yet another object of the present invention is to provide a novel tracer head which has a small contact pressure of the stylus against a model and which has a low cost.

According to one feature of the present invention, there is provided a tracer head for effecting three dimensional tracing of a model surface, comprising a base frame, a tracer shaft, a stylus mounted at one end of said tracer shaft for tracing said model surface, a plurality of supports for said tracer shaft provided at at least two locations on said base frame, each support including a member which has a moderate resiliency in the thrust direction of said tracer shaft as well as a strong resiliency exceeding a certain extent or is rigid in the radial direction of said tracer shaft, three displacement detectors mounted on said base frame, one of which is for detecting displacement in the thrust direction and the remaining two of which are for detecting displacement in the radial direction, a rod spring forming a part of said tracer shaft and disposed between said supports for transmitting movement of said stylus in the thrust direction to said thrust direction displacement detector and having a moderate resiliency in the radial direction of said tracer shaft for being bent when the stylus is moved laterally, and a cylindrical transmission member around said rod spring and attached to said thrust rod adjacent said support closest to said stylus for transmitting movement of said stylus to said radial direction displacement detectors.

These and other features and objects of this invention will become more apparent by reference to the following description taken in conjunction with the accompanying drawings, in which:

FIG. 1 is a diagrammatic view for explaining one example of the tracer heads of the prior art, FIGS. 2, 3a and 4 are schematic views for explaining one preferred embodiment of the present invention, FIG. 2 being a longitudinal cross-section, FIG. 3a being a transverse cross-section taken along line C—C or line D—D in FIG. 2 as viewed in the direction of the arrows, and FIG. 4 being another cross-section taken along line E—E in FIG. 2 as viewed in the direction of the arrows, FIGS. 3b to 3n show modified examples of the resilient member shown in FIG. 3a, FIG. 5a is a longitudinal cross-section showing another modified example of the resilient member shown in FIG. 3a, FIG. 5b is a transverse cross-section taken along line C'—C' in FIG. 5a as viewed in the direction of the arrows;

FIG. 6b is a transverse cross-section taken along line C''—C'' in FIG. 6a; and

Figure 1:
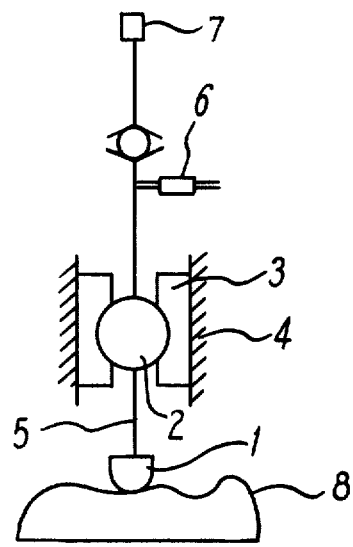
Figure 2:
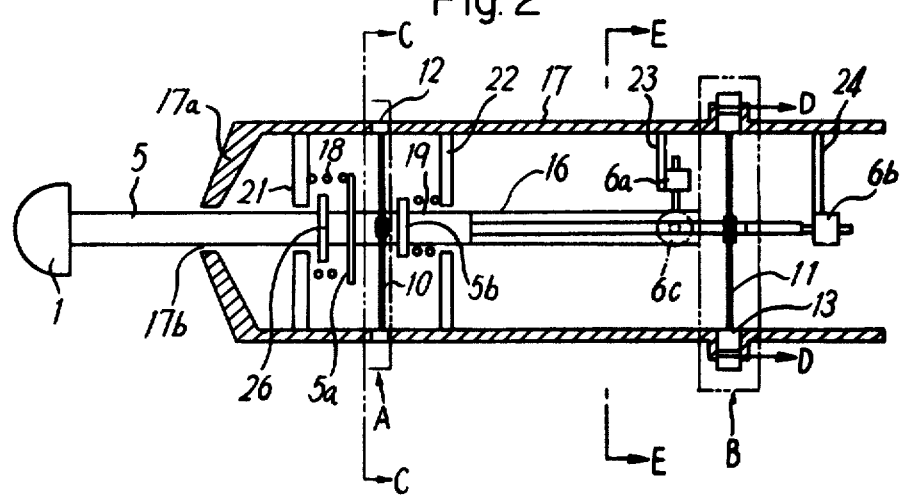
Figure 3K:
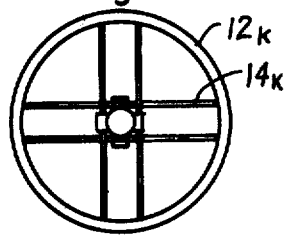
Figure 3L:
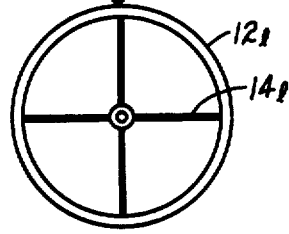
Figure 3A:
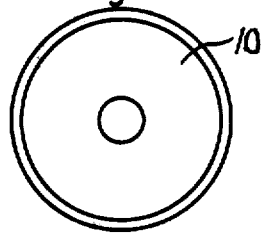
Figure 3B:
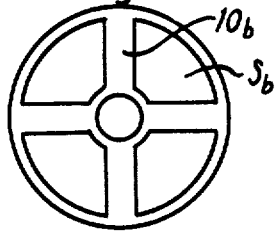
Figure 3C:
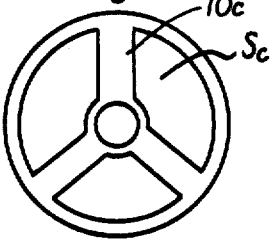
Figure 3D:
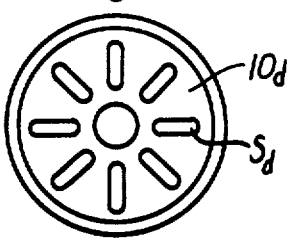
Figure 3E:
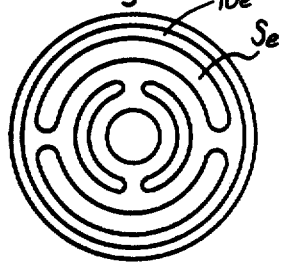
Figure 3M:
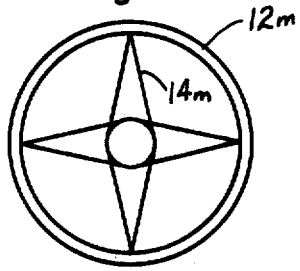
Figure 3N:
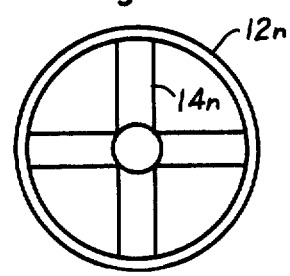
Figure 4:
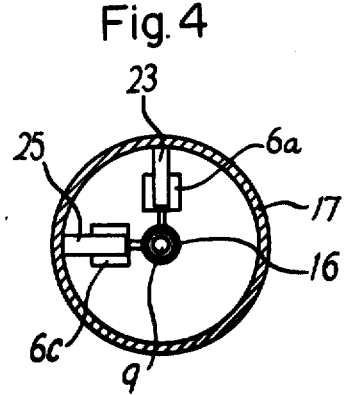

Referring now to FIGS. 2 to 4 of the drawings, in FIG. 2 reference numeral 17 designates a cylindrical base frame having its rear end (right end as viewed in FIG. 2) open and provided at its front end (left end as viewed in FIG. 2) with a conical section 17a having at its center a bore 17b through which a tracer shaft 5 can extend loosely in a coaxial position. At suitable positions on the peripheral wall of said base frame 17 are supports A and B for the tracer shaft 5 fixedly secured at appropriate intervals in the axial direction of the base frame 17. The supports A and B, respectively consist of circular frames 12 and 13 having circular disc shaped resilient members 10 and 11 mounted therein as shown in FIG. 3a, and the centers of these circular disc shaped resilient members 10 and 11 are positioned in alignment with the center axis of the base frame. At the center portion of the disc shaped resilient member 10 is fixedly secured an appropriate portion of the tracer shaft 5 as shown in FIG. 2, while at the center portion of the disc shaped resilient member 11 is fixedly secured an appropriate portion of an extension of a rod spring 9 that is coaxially and integrally inserted into a cylindrical transmission member 16 which is in turn coaxially connected to the rear end (the end on the end opposite to the stylus 1) of the tracer shaft 5 (see FIG. 4). This cylindrical transmission member 16 is made of light-weight material such as aluminum series alloys for the purpose of reducing its weight. For the rod spring 9, any material can be used so long as the material is isotropic with respect to the movement in the radial direction of the stylus 1 and has a uniform and moderate resiliency in every direction as well as a sufficient strength against yielding in the axial direction. In the above-described preferred embodiment, the circular disc resilient members 10 and 11 fixedly secured to the base frame 17 via frames 12 and 13, respectively, form the supports A and B for the tracer shaft 5, and each of said resilient members 10 and 11 consists of a member having a moderate resiliency in the thrust direction, that is, the axial direction of the tracer shaft 5 as well as either a strong resiliency exceeding a certain extent or rigidity in the radial directions, that is, in the directions contained in the plane perpendicular to the tracer shaft 5. In addition, the cylindrical transmission member 16 containing the rod spring 9 coaxially and integrally therein and coaxially connected to the tracer shaft 5, forms jointly with a part of the tracer shaft 5 a tracer shaft section between the supports A and B, and also forms a member for transmitting the movement of the stylus 1 to displacement detectors in the X and Y directions as described later.

Figure 7:
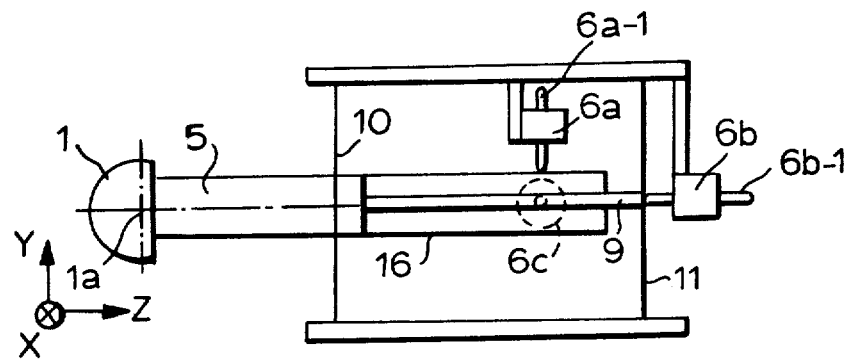
FIGS. 7 to 9 are diagrammatic views for explaining the principle of operation of the present invention, especially the bending of the rod spring 9 which is characteristic of the present invention.
Figure 8:
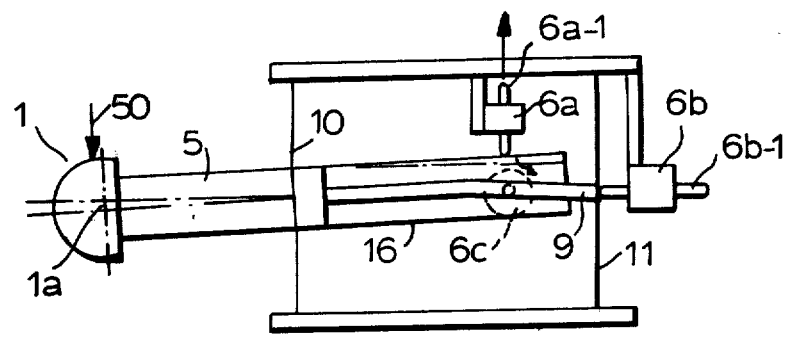
Figure 9:
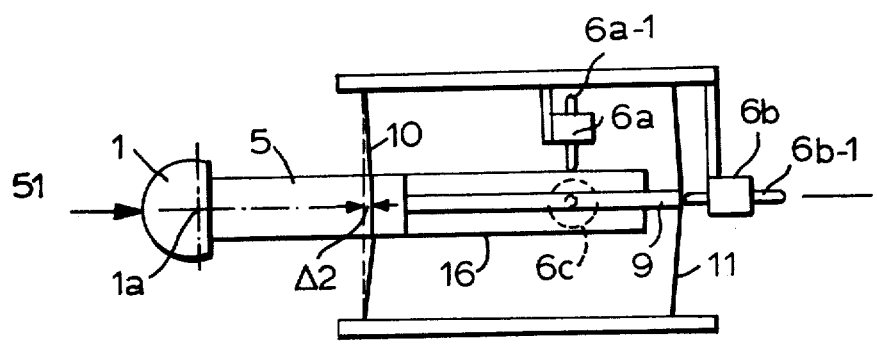

Reference numerals 6a, 6b and 6c designate displacement detectors, which are fixedly secured to the base frame 17 by brackets 23, 24 and 25, respectively, projecting from suitable positions on the inner peripheral wall of the base frame 17 (See FIGS. 2 and 4). When no external force is applied to the stylus 1, that is, when the stylus 1 is in a free condition, the output signal of all the displacement detectors (6a, 6b and 6c) is adjusted so as to be zero (see FIG. 7). When an external lateral force 50 is applied to the center 1a of the stylus, exactly downwards as viewed in this figure, then the tracer shaft 5 and the rod spring 9 are supported at two fulcra, one of which is the center of the member 10 and the other of which is the center of the member 11. Accordingly, the tracer shaft 5, which is rigid, pivots downwards around the center of member 10, the rod spring 9 has its shape change from straight into an upwardly convex form and the cylindrical transmission member 16 pivots upwards, so that the core 6a-1 of the displacement detector 6a is moved upwards by an amount Δ1, and the displacement detector 6a transmits a minus (−) output signal. The output signals of the displacement detectors 6b and 6c, respectively, will remain zero in practical use. In the same manner, if an external lateral force is applied upwards as viewed in FIG. 8, then the tracer shaft 5 pivots upwards, the rod spring 9 changes its shape from a straight form into a downwardly convex form, and the cylindrical transmission member 16 pivots downwards, so that the core 6a-1 is moved downwards, and the displacement detector 6a transmits a plus (+) signal. The output signals of the displacement detectors 6b and 6c, respectively, remain zero as before. If an external lateral force which is perpendicular to the above-described first external force is applied to the center 1a of the stylus 1 exactly perpendicular to the plane of FIG. 8, then the rod spring 9 changes its shape from a straight form into a concave form with respect to the plane of the figure, and this time the displacement detector 6c transmits a plus (+) or minus (−) signal, while the output of the displacement detectors 6a and 6b remains zero. On the other hand, if an external force 51 is applied to the center 1a of the stylus 1 in the axial direction from the left to the right as shown in FIG. 7, then the two support positions for the tracer shaft 5 and the rod spring 9 located at the centers of the members 10 and 11 are moved rightwards by a distance Δ2, and this time the rod spring 9 remains straight, so that the displacement detector 6b transmits a plus (+) output, while the output of each of the displacement detectors 6a and 6c remains zero. Thus the movement of the stylus 1 in the axial direction is transmitted to the displacement detector 6b through the tracer shaft 5 and the rod spring 9, while the movement of the stylus 1 in one radial direction is transmitted to the displacement detector 6c through the tracer shaft 5 and the cylindrical transmission member 16, and the movement of the stylus 1 in another radial direction perpendicular to said one radial direction is transmitted to the displacement detector 6a in a similar manner.

In general, when any external force is applied to the stylus 1, the displacement detectors 6a, 6b and 6c transmit output signals corresponding to the components of the applied external force in the axial direction (Z) and in the radial directions (X and Y), respectively.

The above-described circular disc resilient members 10 and 11 can have various configurations as shown in FIGS. 3b to 3j, in which punched out sections S having various shapes are provided for the purpose of reducing the resiliency of the members 10 and 11 in the axial direction. In addition, as shown in FIGS. 3k to 3m, the structures of the resilient members can be modified by providing a plurality of resilient wire pieces 14 stretched between selected points on the frame 12 or 13 to form a symmetric pattern of said resilient wire pieces about the center of the frame 12 or 13.

More specifically, in FIG. 3b, quadrant-shaped apertures $S_b$ are punched out of the disc 10, leaving 4 legs 10b at 90° relative to reach other. In FIG. 3c apertures $S_c$ are punched out of the disc to leave only 3 such legs 10c at 120° relative to each other. In FIG. 3d radially extending apertures $S_d$ are punched out of the disc 10d at equal angular intervals. In FIG. 3e, semi-circular shaped apertures $S_e$ are punched out of the disc leaving the portion 10e as shown. In FIG. 3f, apertures $S_f$ defined by the inner periphery of the frame and a chord are punched out of the disc, leaving a portion 10f in the form of a wide band across the center of the frame. In FIG. 3g, similar shaped apertures $S_g$ are punched out of the disc, leaving a generally tringular shaped portion 10g. In FIG. 3h, a plurality of such apertures are punched, lateral outer apertures $S_h$ being smaller than lateral inner apertures, leaving a band portion 10h. In FIG. 3i, spirally shaped apertures $S_i$ are punched out of the disc, leaving spiral legs 10i. In FIG. 3j, the disc is punched with a plurality of circular holes and apertures $S_j$ to leave a disc portion which is in the form of a plurality of circles 10j. In FIG. 3k, pairs of transverse wires 14k are extending across the frame perpendicular to each other. In FIG. 3l, four wires 14l are provided extending radially from the tracer shaft means to the outer frame 12l. In FIG. 3m, two pairs of wires 14m extend across the frame 12m from single points spaced at 90° around the transfer shaft means. In FIG. 3n, the wires are positioned similarly to FIG. 3k, but are short wires 14n extending from the transfer shaft means to the outer frame 12n.

In a modified embodiment illustrated in FIGS. 5a and 5b, a bellows member 30 is used in place of the above-described resilient member, and in this case, a welded bellows is more preferable than the conventional shaped bellows to provide greater rigidity in the radial directions. More particularly, the resilient member is replaced by a combination of an annular plate 30a having an inner diameter substantially larger than the diameter of the tracer shaft 5, a circular plate 30b having an outer diameter substantially larger than the inner diameter of said annular plate and adapted to be fixedly secured to said tracer shaft 5 at its center, and an axially resilient bellows 30c connected between the inner periphery of the annular plate 30a and the outer periphery of the circular plate 30b.

Figure 6A:
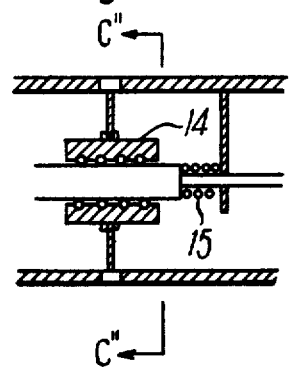
FIG. 6a is a longitudinal cross-section showing still another modified example of the resilient member shown in FIG. 3.
Figure 6B:
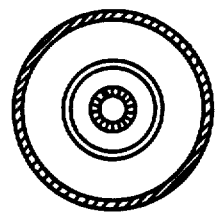

In another modified embodiment illustrated in FIGS. 6a and 6b, the resilient member 10 or 11 is replaced by a combination of a linear motion ball bearing 14 for supporting the tracer shaft 5 so as to be freely moved in its axial direction and a coil spring 15 interposed between the tracer shaft 5 and a member fixed relative to said base frame so as to exert a resilient force in the axial direction upon said tracer shaft. Although the above-referred linear motion ball bearing 14 has a rolling resistance and a little backlash, this modified embodiment can be employed in the case where it is intended to make the axial displacement large and where the resistance and the backlash are not of so much concern.

In FIG. 2, reference numerals 18 and 19 designate coil springs interposed respectively between disc-like members 21 and 22 projecting from appropriate positions on the inner peripheral surface of the base frame 17 and having an aperture for passing the tracer shaft 5 and flanges 5a and 5b, respectively, provided on the outer periphery of the tracer shaft 5, and these springs 18 and 19 are useful for adjusting the spring constant in the axial direction of the resilient members 10 and 11, and also for balancing the weight of the stylus 1 when using the tracer head in a vertical attitude.

In addition, in the case where it is necessary to try to achieve an optimum arrangement of the mounting positions of operational parts such as the displacement detectors 6a, 6b and 6c, and others within the base frame 17, besides the supports A and B any necessary number of supports could be provided additionally. It is to be noted that reference numeral 26 in FIG. 2 designates a member mounted on the tracer shaft 5 for preventing said tracer shaft 5 from being disengaged from the base frame 17.

The tracer head according to the present invention is constructed as described above, and it is used with its base frame 17 fixedly secured to a machining head (headstock) of a profile machining apparatus in the conventional manner. The subject tracer head can be used not only in either a horizontal or vertical position, but also in an inclined attitude between the vertical and horizontal positions.

In the tracer head according to the present invention, among the movable parts for transmitting the displacement of the stylus 1 to the displacement detectors 6a, 6b and 6c, the only part required to have high rigidity is the tracer shaft 5, and no especially strong force is exerted upon the remaining movable parts such as the resilient members 10 and 11, rod spring 9 and cylindrical transmission member 16. Accordingly, these remaining movable parts can be made light in weight, so that as a whole the weight and rotational inertia of the movable parts can be greatly reduced in comparison to the tracer heads in the prior art. Furthermore, the contact pressure of the tracer head upon the model is low, the natural frequency of vibration of the movable parts is high, and thus the adverse effects caused by the friction between the stylus and the model can be mitigated.

Since the tracer head according to the present invention has the aforementioned construction and function, the present invention can afford the practical advantages that the shortcomings and difficulties of the conventional tracer heads are eliminated, the tracing work can be achieved in a highly efficient and precise manner, the life of the model is increased and further, a less expensive tracer head can be made.

What is claimed is:

1. A tracer head for effecting three dimensional tracing of the surface of a model, comprising a base frame, a tracer shaft means extending through said base frame and having a tracer shaft on one end thereof, a stylus mounted at the free end of said tracer shaft for tracing the surface of the model, a plurality of at least two supports for said tracer shaft means in said base frame spaced along the length of said tracer shaft means, the support closer to the end of said tracer shaft means supporting said tracer shaft adjacent the other end of said tracer shaft, said tracer shaft means further having a rod spring extending from the other end of said tracer shaft and being supported by the second support and having a moderate resiliency in the radial direction of said tracer shaft means, each support including a member which has a moderate resiliency in the thrust direction and at the least substantially no resiliency and at the most rigidity in the radial direction of the tracer shaft means, a thrust displacement detector adjacent said rod spring for having movement of the stylus in the thrust direction transmitted thereto by the rod spring, a pair of lateral movement detectors positioned adjacent said tracer shaft means between said supports for detecting components of lateral movement of said tracer shaft means imparted thereto by lateral movement of said stylus, and a cylindrical transmission member around said rod spring and mounted on said tracer shaft means between said supports and movable upon lateral movement of said tracer shaft and bending of said rod spring as a result of such movement and contacting said lateral movement detectors for transmitting the lateral movement thereto.

2. A tracer head as claimed in claim 1, in which said cylindrical transmission member is mounted on the other end of said tracer shaft.

3. A tracer head as claimed in claim 1, in which said support members comprise a circular peripheral frame and generally circular disc mounted in said peripheral frame and made of resilient material having an aperture at the center for fixing said tracer shaft means to said disc.

4. A tracer head as claimed in claim 1, in which said support members comprise a circular peripheral frame and a generally circular disc mounted in said peripheral frame and made of resilient material having an aperture at the center for fixing said tracer shaft to said member, said disc having apertures therein to reduce the resiliency thereof in the thrust direction.

5. A tracer head as claimed in claim 1, in which said support member comprises a circular peripheral frame and a plurality of resilient wires stretched between selected points on said frame for forming a symmetric pattern of said resilient wires around the center of said circular peripheral frame.

6. A tracer head as claimed in claim 7, in which said support members comprise an annular plate having an inner diameter substantially larger than the diameter of said tracer shaft, a circular plate having an outer diameter substantially larger than the inner diameter of said annular plate and fixedly secured to said tracer shaft means at the center thereof, and an axially resilient bellows connected between the inner periphery of said annular plate and the outer periphery of said circular plate.

7. A tracer head as claimed in claim 1, in which said support members comprise a linear motion ball bearing supporting said tracer shaft means so as to be freely movable in the axial direction thereof and a coil spring interposed between said tracer shaft means and a member fixed relative to said base frame for exerting a resilient force in said axial direction upon said tracer shaft means.

* * * * *